US009760893B2

(12) United States Patent
Jacobs et al.

(10) Patent No.: US 9,760,893 B2
(45) Date of Patent: Sep. 12, 2017

(54) SYSTEM AND METHOD FOR EFFECTIVELY SUPPORTING AN ADVERTISING CATALOG IN AN ELECTRONIC NETWORK

(75) Inventors: Stephen Jacobs, Ardsley, NY (US); Rajiv Rainier, San Diego, CA (US); Milton Frazier, San Marcos, CA (US); Austin Noronha, Sunnyvale, CA (US); Tim Smith, Carlsbad, CA (US); Donald L. Loughery, III, Long Beach, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 760 days.

(21) Appl. No.: 12/454,403

(22) Filed: May 18, 2009

(65) Prior Publication Data

US 2010/0293031 A1    Nov. 18, 2010

(51) Int. Cl.
*G06Q 40/00* (2012.01)
*G06Q 30/02* (2012.01)
*G06Q 10/08* (2012.01)

(52) U.S. Cl.
CPC .......... *G06Q 30/02* (2013.01); *G06Q 10/087* (2013.01); *G06Q 30/0241* (2013.01); *G06Q 30/0255* (2013.01); *G06Q 30/0258* (2013.01); *G06Q 30/0261* (2013.01)

(58) Field of Classification Search
USPC ...................................................... 707/709
See application file for complete search history.

(56) References Cited

U.S. PATENT DOCUMENTS

| | | | |
|---|---|---|---|
| 6,012,041 A | 1/2000 | Brewer et al. | |
| 6,119,101 A | 9/2000 | Peekover | |
| 6,757,682 B1 | 6/2004 | Naimark et al. | |
| 7,660,815 B1 * | 2/2010 | Scofield et al. | 707/999.102 |
| 2002/0099600 A1 | 7/2002 | Merriman et al. | |
| 2007/0260521 A1 * | 11/2007 | Van Der Riet | 705/14 |
| 2008/0005233 A1 | 1/2008 | Cai et al. | |
| 2008/0109528 A1 | 5/2008 | Knight et al. | |
| 2008/0228600 A1 | 9/2008 | Treyz et al. | |
| 2009/0048913 A1 | 2/2009 | Shenfield et al. | |
| 2009/0113476 A1 | 4/2009 | Vogel | |
| 2010/0057591 A1 * | 3/2010 | Bhogal et al. | 705/28 |

FOREIGN PATENT DOCUMENTS

| | | |
|---|---|---|
| JP | 2002-169829 | 6/2002 |
| JP | 2002-269188 | 9/2002 |
| WO | WO 2005122020 | 12/2005 |

* cited by examiner

*Primary Examiner* — Shay S Glass
(74) *Attorney, Agent, or Firm* — Chip Law Group

(57) ABSTRACT

A system and method for distributing reminder information in an electronic network includes an information service that is configured to provide information distribution services through said information distribution network. User devices are provided for device users to communicate with the information service for receiving the information distribution services. A transport structure communicates with network entities in the information distribution network for collecting appropriate types of metadata. A transport server then performs a metadata analysis procedure upon the various types of metadata to responsively generate the reminder information.

16 Claims, 14 Drawing Sheets

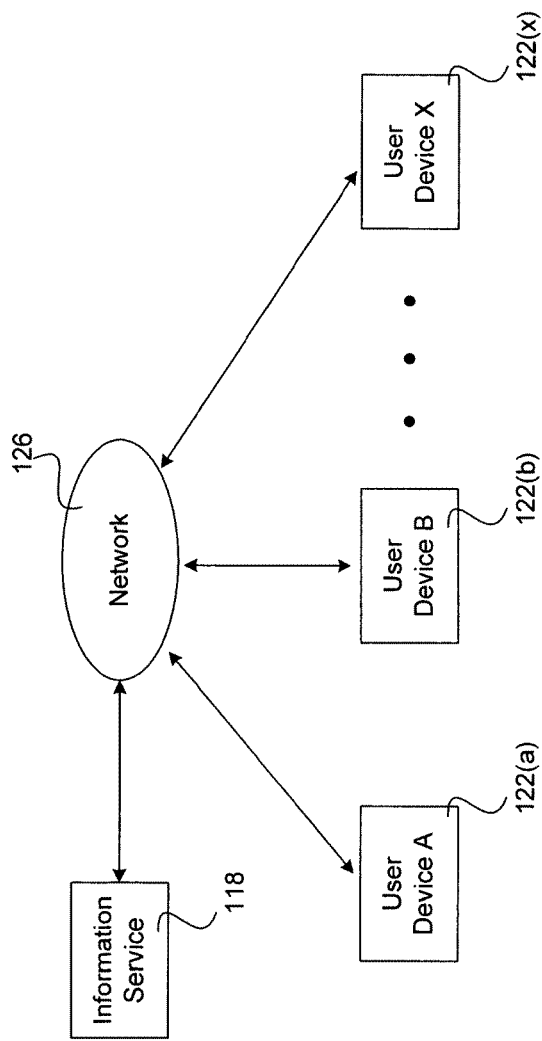

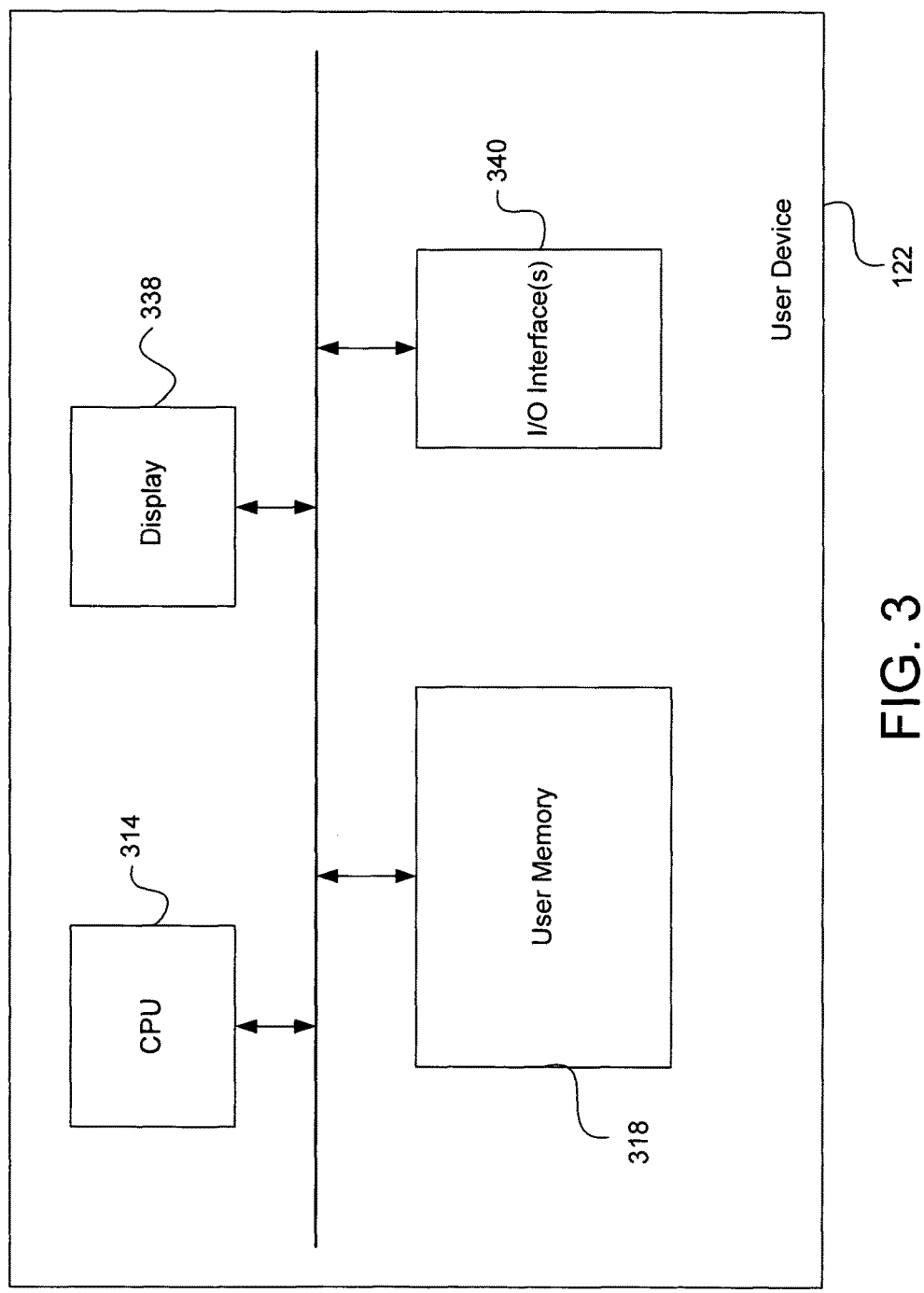

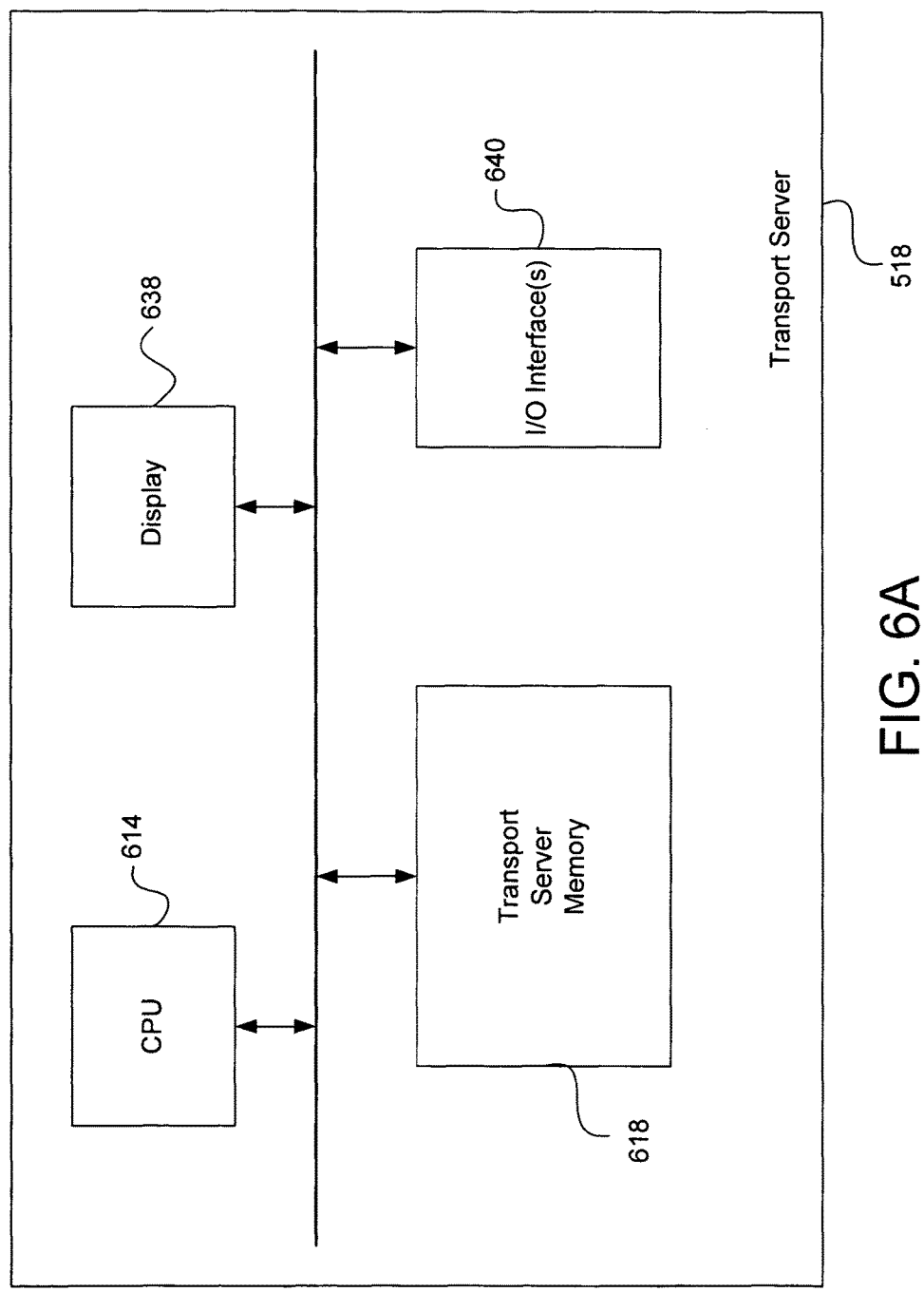

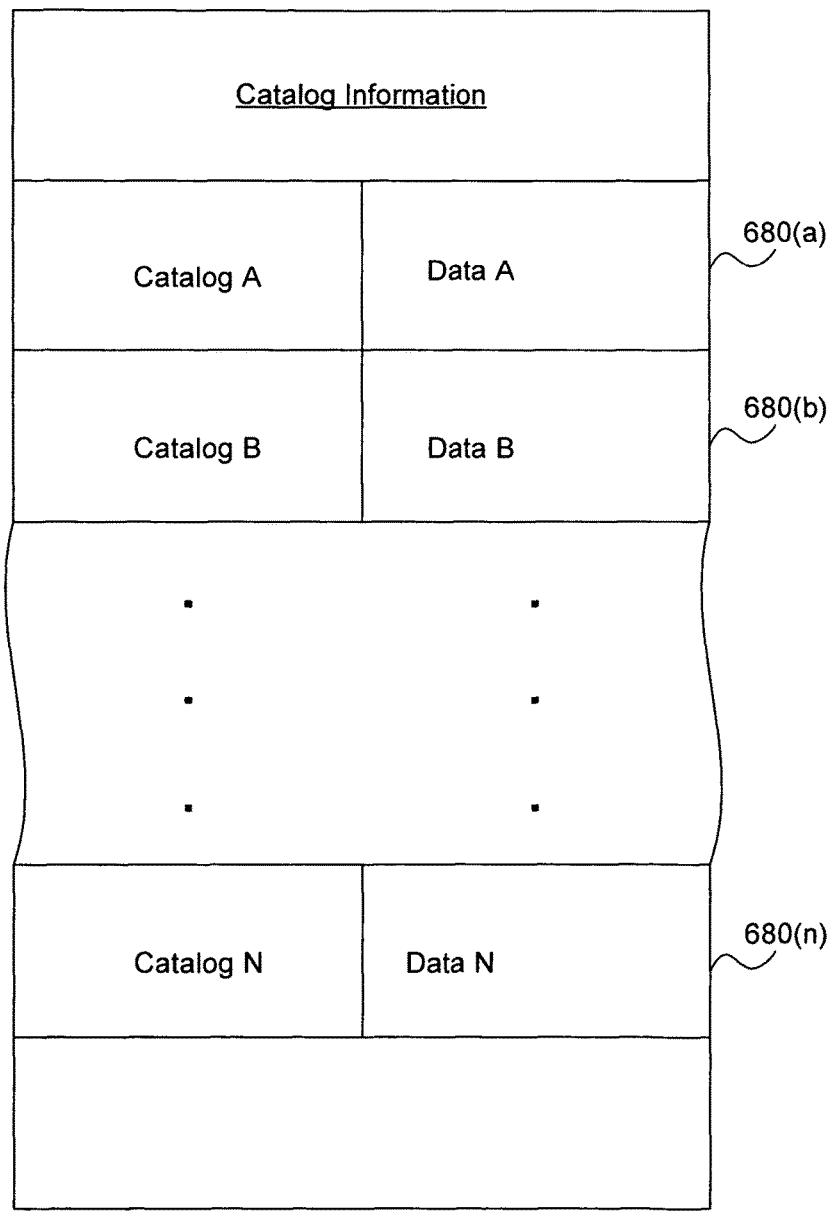
668  FIG. 6C

SYSTEM AND METHOD FOR EFFECTIVELY SUPPORTING AN ADVERTISING CATALOG IN AN ELECTRONIC NETWORK

BACKGROUND SECTION

1. Field of the Invention

This invention relates generally to techniques for distributing electronic information, and relates more particularly to a system and method for effectively supporting an advertising catalog in an electronic network.

2. Description of the Background Art

Implementing effective methods for distributing electronic information is a significant consideration for designers and manufacturers of contemporary electronic systems. However, effectively distributing electronic information utilized by electronic devices may create substantial challenges for system designers. For example, enhanced demands for increased system functionality and performance may require more system processing power and require additional software resources. An increase in processing or software requirements may also result in a corresponding detrimental economic impact due to increased production costs and operational inefficiencies.

Furthermore, enhanced system capability to perform various advanced distribution operations may provide additional benefits to a system user, but may also place increased demands on the control and management of various system components. For example, an electronic system that effectively manages electronic coupon and advertising information may benefit from an effective implementation because of the large amount and complexity of the digital data involved.

Due to growing demands on system resources and substantially increasing data magnitudes, it is apparent that developing new techniques for distributing electronic information to electronic devices is a matter of concern for related electronic technologies. Therefore, for all the foregoing reasons, developing effective techniques for distributing electronic information remains a significant consideration for designers, manufacturers, and users of contemporary electronic systems.

SUMMARY

In accordance with the present invention, a system and method for effectively supporting an advertising catalog in an electronic network are disclosed. In one embodiment, a distribution system automatically provides various types of appropriate information for utilization by device users of corresponding user devices. For example, the distributed information may include, but is not limited to, commercial advertising and related reminder information that is targeted towards specific device users. Unlike traditional advertising techniques that support a "pull" model that requires consumers to actively access desired advertising information, the foregoing distribution system supports a "push" model that automatically selects and transmits appropriate advertising information to targeted device users based upon corresponding metadata files that define both the device users and the various advertisers.

In one embodiment, the distribution system may support and utilize one or more transport structures that automatically transport various types of relevant information to and from appropriate entities in the distribution system. For example, the transport structures may be utilized to gather and transfer metadata regarding the various device users, the user devices, the electronic network, current inventories of consumable products, and respective advertisers from an information service. In addition, the transport structures may also be utilized to provide links to targeted reminder information, advertisements and/or electronic content to appropriate user devices.

In certain embodiments, one or more transport structures are initially created in any effective manner. For example, the transport structures may be embedded in user devices during manufacture, and then activated by device users. Alternately, an appropriate entity in the distribution system may create or otherwise provide the initial transport structures. Advertiser metadata from one or more advertisers may be added to the transport structures in any effective manner to represent relevant characteristics and advertising goals of the corresponding advertisers.

In addition, appropriate media files may be created to include information for dissemination to targeted device users through the distribution system. The media files may include any desired information, such as advertisements, reminder information, and content items. Next, device users may perform a registration procedure to subscribe for receiving information from the distribution system. During the registration procedure, the device users typically provide various types of relevant information including, but not limited to, user metadata and device metadata. The transport structures are updated to include the user metadata provided by the device users during the foregoing registration procedure.

In accordance with the present invention, catalog metadata may be collected from appropriate sources in any effective manner. For example, catalog metadata may be obtained from appropriate user devices, merchant transaction devices, and intelligent home appliances and/or storage cabinets to indicate relevant information about current inventory levels and commercial transaction histories for inventory items from the advertising catalog. The catalog metadata is then utilized to update corresponding information in one or more transport structures for transfer to a transport server.

The transport server or other appropriate entity analyzes the metadata provided by the transport structure(s). In light of the metadata analysis and predefined transmission criteria, the transport server then determines whether to transmit corresponding reminder information and/or advertising information to targeted device users. If the specified transmission criteria are satisfied, then the transport server generates appropriate reminder information for targeted device users by utilizing any effective means. For example, in certain embodiments, a catalog manager of the transport server generates predefined reminder information with reference to the advertising catalog when a respective inventory amount falls below a reminder threshold for a corresponding inventory item.

The transport server may then transmit the generated reminder information to the targeted device users by utilizing any effective means. For example, in certain embodiments, one or more transport structures may be utilized to convey reminder information to respective user devices. Local display devices of corresponding user devices then typically display the received reminder information for viewing by the device users. The device users may advantageously utilize the reminder information in any appropriate manner. For example, in certain embodiments, device users may responsively perform commercial transactions to obtain one or more inventory items that are referenced in the reminder information.

Finally, feedback metadata regarding the reminder information and/or the commercial transactions may be generated and provided to advertisers or other interested entities in any effective manner. For example, in certain embodiments, a user device of a merchant involved in the commercial transactions may automatically generate feedback metadata. The feedback metadata may be transported to advertisers or other interested parties by utilizing one or more transport structures or other effective techniques. Based upon the feedback metadata, advertisers may thus more accurately analyze the effectiveness and efficiency of their corresponding advertisements and reminder strategies. For at least the foregoing reasons, the present invention therefore provides an improved system and method for effectively supporting an advertising catalog in an electronic network.

BRIEF DESCRIPTION OF THE DRAWINGS

FIG. 1A is a block diagram of a distribution system, in accordance with one embodiment of the present invention;

FIG. 3 is a block diagram for one embodiment of a user device from FIG. 1A, in accordance with the present invention;

FIG. 6A is a block diagram for one embodiment of the transport server from FIG. 5, in accordance with the present invention;

FIG. 6C is a block diagram for one embodiment of the catalog information from FIG. 6B, in accordance with the present invention;

DETAILED DESCRIPTION

Figure 1B:
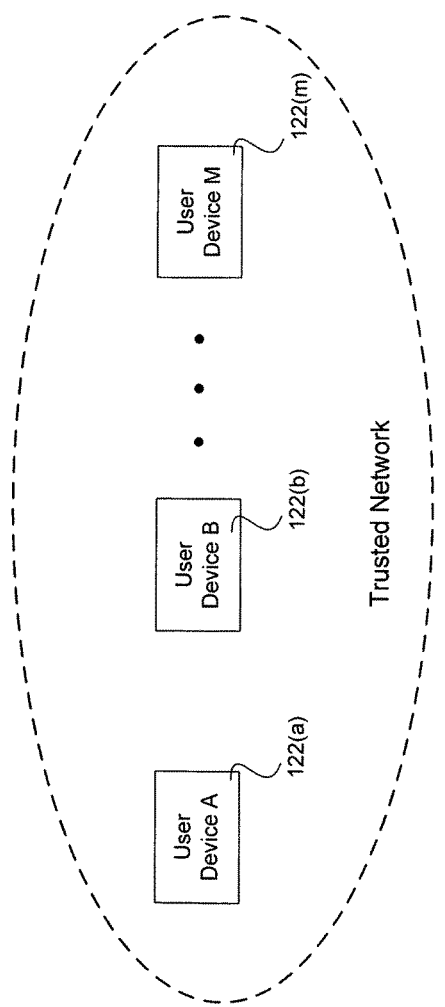
FIG. 1B is a block diagram of a trusted network, in accordance with one embodiment of the present invention.

The present invention relates to an improvement in electronic data distribution techniques. The following description is presented to enable one of ordinary skill in the art to make and use the invention, and is provided in the context of a patent application and its requirements. Various modifications to the disclosed embodiments will be apparent to those skilled in the art, and the generic principles herein may be applied to other embodiments. Therefore, the present invention is not intended to be limited to the embodiments shown, but is to be accorded the widest scope consistent with the principles and features described herein.

The present invention comprises a system and method for distributing reminder information in an electronic network, and includes an information service that is configured to provide information distribution services through said information distribution network. User devices are provided for device users to communicate with the information service for receiving the information distribution services. A transport structure communicates with network entities in the information distribution network for collecting appropriate types of metadata. A transport server then performs a metadata analysis procedure upon the various types of metadata to responsively generate the reminder information.

Referring now to FIG. 1A, a block diagram of a distribution system 110 is shown, in accordance with one embodiment of the present invention. In the FIG. 1A embodiment, distribution system 110 may include, but is not limited to, one or more user devices 122, an information service 118, and a network 126. In alternate embodiments, distribution system 110 may be implemented by utilizing components and configurations in addition to, or instead of, certain of those components and configurations discussed in conjunction with the FIG. 1A embodiment.

In accordance with the present invention, distribution system 110 advantageously supports a distribution procedure that automatically provides various types of appropriate information for utilization by device users of corresponding user devices 122. For example, the distributed information may include, but is not limited to, commercial advertising and reminder information that is specifically targeted towards appropriate device users of user devices 122. Unlike traditional advertising techniques that support a "pull" model that requires consumers to actively access desired advertising information, the FIG. 1A distribution system 110 supports a "push" model that automatically selects and transmits appropriate reminder information and advertising to targeted device users based upon corresponding metadata that defines the device users and the various advertisers.

In the FIG. 1A embodiment, distribution system 110 may be implemented and supported by a distribution control entity that offers distribution services to the advertisers and device users in return for financial or other compensation. The distribution control entity may be a commercial enterprise that maintains and controls key elements of distribution system 110 such as the information service 118.

In certain embodiments, distribution system 110 may advantageously support and utilize one or more transport structures (see FIG. 2A) that automatically transport various types of relevant information to and from appropriate entities in distribution system 110. For example, the transport structures may be utilized to gather and transfer metadata regarding the various device users, the user devices 122, the network 126, and respective advertisers from information service 118. In addition, the transport structures may also be utilized to transport or provide links to targeted reminders, advertisements and/or electronic content for appropriate user devices 122.

The foregoing reminders and advertisements may be generated with reference to a predefined advertising catalog of corresponding products or services. The present invention thus proves an improved system and method for effectively supporting an advertising catalog in an electronic network. Further details regarding the implementation and utilization of an advertising catalog in the FIG. 1A distribution system 110 are discussed below in conjunction with FIGS. 1B-8C.

Referring now to FIG. 1B, a block diagram of a trusted network 150 is shown, in accordance with one embodiment of the present invention. In the FIG. 1B embodiment, trusted network 150 may include, but is not limited to, one or more user devices 122(a) through 122(m). In FIG. 1B, the user devices 122 may be the same or similar to correspondinglynumbered user devices 122(*a*) through 122(*m*) from FIG. 1A. In the FIG. 1B embodiments the various user devices 122 may each perform bi-directional communications with any or all of the other user devices 122 in trusted network 150 by using any effective communication techniques. For example, the user devices 122 may communicate by utilizing peer-to-peer techniques or personal area network (PAN) technology.

The FIG. 1B trusted network 150 is presented for purposes of illustration, and in alternate embodiments, trusted network 150 may be implemented by utilizing components and configurations in addition to, or instead of, certain of those components and configurations discussed in conjunction with the FIG. 1B embodiment. For example, any desired number or type of user devices 122 may be utilized by corresponding device users to form trusted network 150. In the FIG. 1B embodiment, trusted network 150 may be defined or created by utilizing any effective techniques.

In the FIG. 1B embodiment, certain of the user devices 122 may be implemented as electronic transaction cards (such as known or enhanced SmartCards) that electronically communicate with other user devices 122 to receive and store electronic coupon information. In addition, certain of the user devices 122 may be implemented as electronic transaction token (such as known or enhanced SmartTokens) that electronically communicate with other user devices 122 to receive and store electronic coupon information. These transaction cards or transaction tokens may communicate with user devices 122 of merchants or other sales entities.

In the FIG. 1B embodiment, certain of the user devices 122 may be implemented as digital signs or other types of intelligent local display devices. In certain embodiments, a given user device 122 may utilize an automatic communication procedure to transparently provide receptiveness metadata to one or more nearby digital signs. The digital signs may then automatically identify and display targeted and relevant advertisements and reminder information to the corresponding device user based upon the received receptiveness metadata.

In the FIG. 1B embodiment, certain of the user devices 122 may be implemented as intelligent storage devices (such as cabinets or refrigerators) that are configured to automatically monitor a definable inventory of contents, and communicate with one or more transport structures or user devices 122 to provide catalog metadata regarding the current status of the respective inventory items. In addition, certain of the user devices 122 may be implemented as CRM (customer relationship management) devices that automatically monitor commercial transactions to provide corresponding catalog metadata regarding those transactions to one or more transport structures or appropriate user devices 122.

In accordance with the present invention, advertising catalogs may be created as an effective tool for identifying and providing appropriate reminders and corresponding advertising to targeted device users. Consumable products are routinely utilized by individuals, families, business, and other entities. For example, many drugs are important for treatment of sickness, gasoline is required for powering automobiles, and food supplies are needed for preparing meals. It is both time-consuming and burdensome to monitor the inventory of these consumables and related complementary items. The present invention contemplates developing advertising catalogs that can inform and incent consumer purchases through electronic means.

The present invention envisions exploiting transport structures that provide for trusted exchanges between devices, SmartCards or SmartTokens, and merchant CRM systems. This technique may be utilized to provide specific targeted reminders to a variety of electronic displays. For example, a user could be reminded that it has been a month since breakfast cereal was last purchased, and at a historic rate of consumption, the cereal inventory likely becoming low. Another reminder may inform users that they recently purchased peanut butter, but no jelly inventory exists at home in the intelligent cabinet. The reminder may inquire whether a user would like to purchase the jelly now, because the user is currently at the supermarket. An adjunct to this "adjacency marketing scheme" would be the provisioning, via SmartToken or SmartCard, of a system that would allow movie-goers who had seen a particular theatrical to then receive an incentive to purchase the movie when it is published to DVD.

The present invention could thus facilitate the transmission of a reminder or advertisement to incent the purchase of a complimentary item at the time of greatest consumer need. This technique could also provide an attractive target for those advertisers seeking to switch a consumer to their brand. The present invention could employ a network of interactive devices in a trusted network 150. For example, network-linked intelligent refrigerators and cabinets, a network-located clearinghouse of a consumer's preferences and behaviors, and CRM systems that have trusted relationships with each other.

Figure 2A:
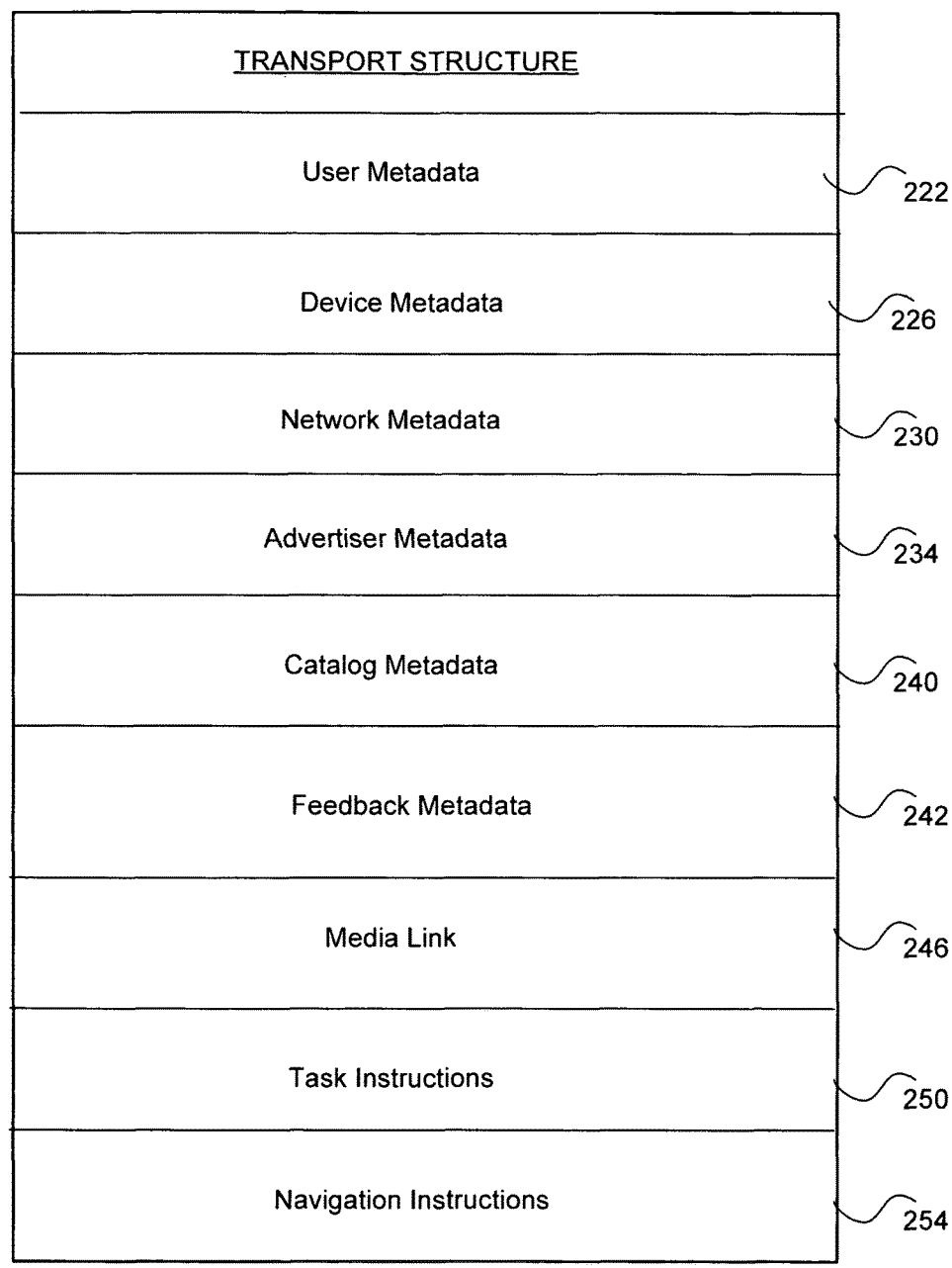
FIG. 2A is a block diagram for one embodiment of a transport structure, in accordance with the present invention.

Referring now to FIG. 2A, a block diagram for one embodiment of a transport structure 210 is shown, in accordance with the present invention. The FIG. 2A embodiment is presented for purposes of illustration, and in alternate embodiments, transport structures 210 may be implemented by utilizing components and configurations in addition to, or instead of, certain of those components and configurations discussed in conjunction with the FIG. 2A embodiment.

Figure 4:
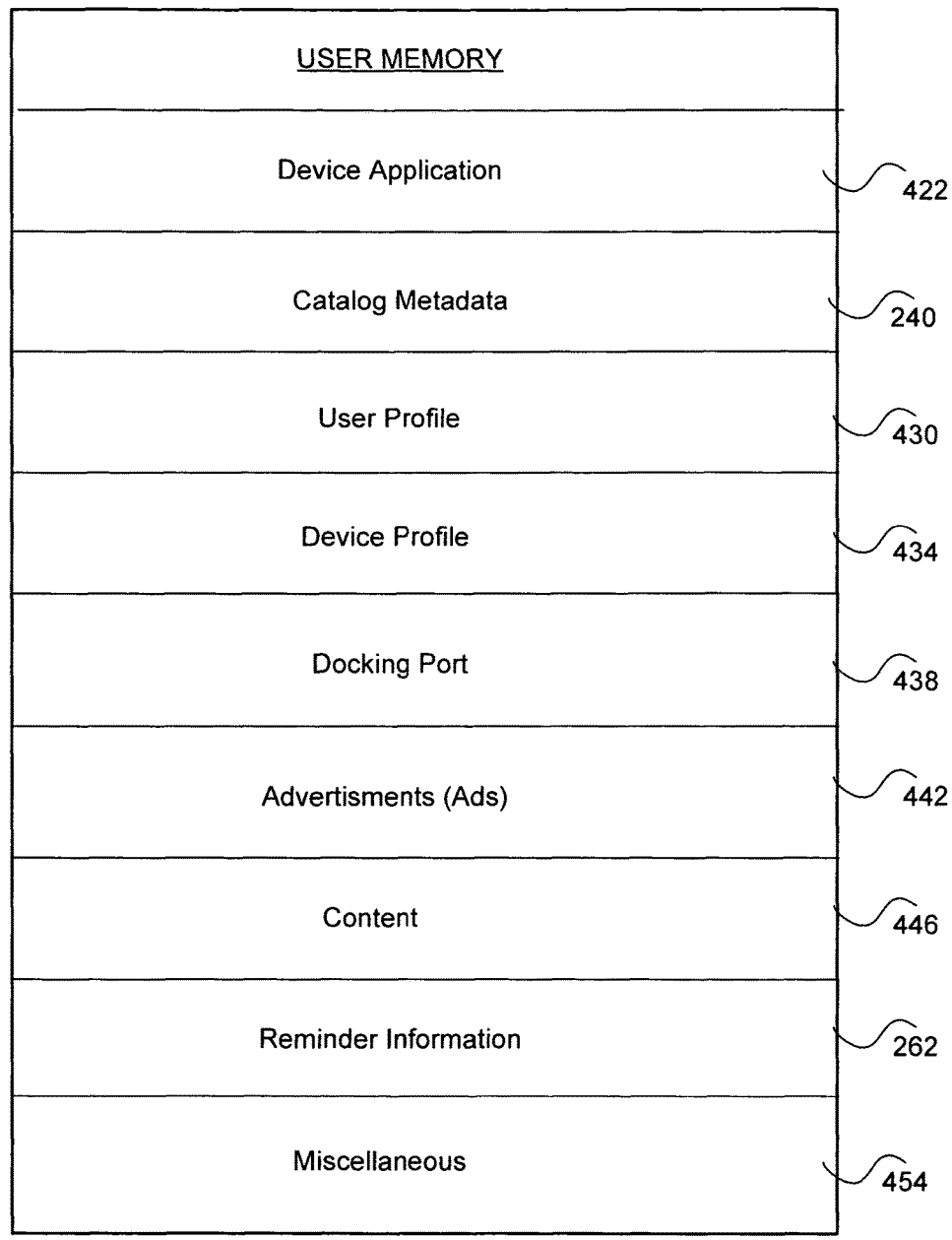
FIG. 4 is a block diagram for one embodiment of the user memory from FIG. 3, in accordance with the present invention.

In the FIG. 2A embodiment, each of the metadata categories/fields includes information from respective corresponding metadata-source types. For example, user metadata 222 may include information regarding one or more device users of user devices 122 (FIG. 1A). In certain embodiments, user metadata 222 may be selectively compiled from one or more appropriate user profiles 430 (FIG. 4). Similarly, device metadata 226 may include information regarding one or more user devices 122. In certain embodiments, device metadata 226 may be selectively compiled from one or more appropriate device profiles 434 (FIG. 4). In the FIG. 2A embodiment, network metadata 230 may include information regarding various attributes or entities of electronic network 126 (FIG. 1A).

Figure 5:
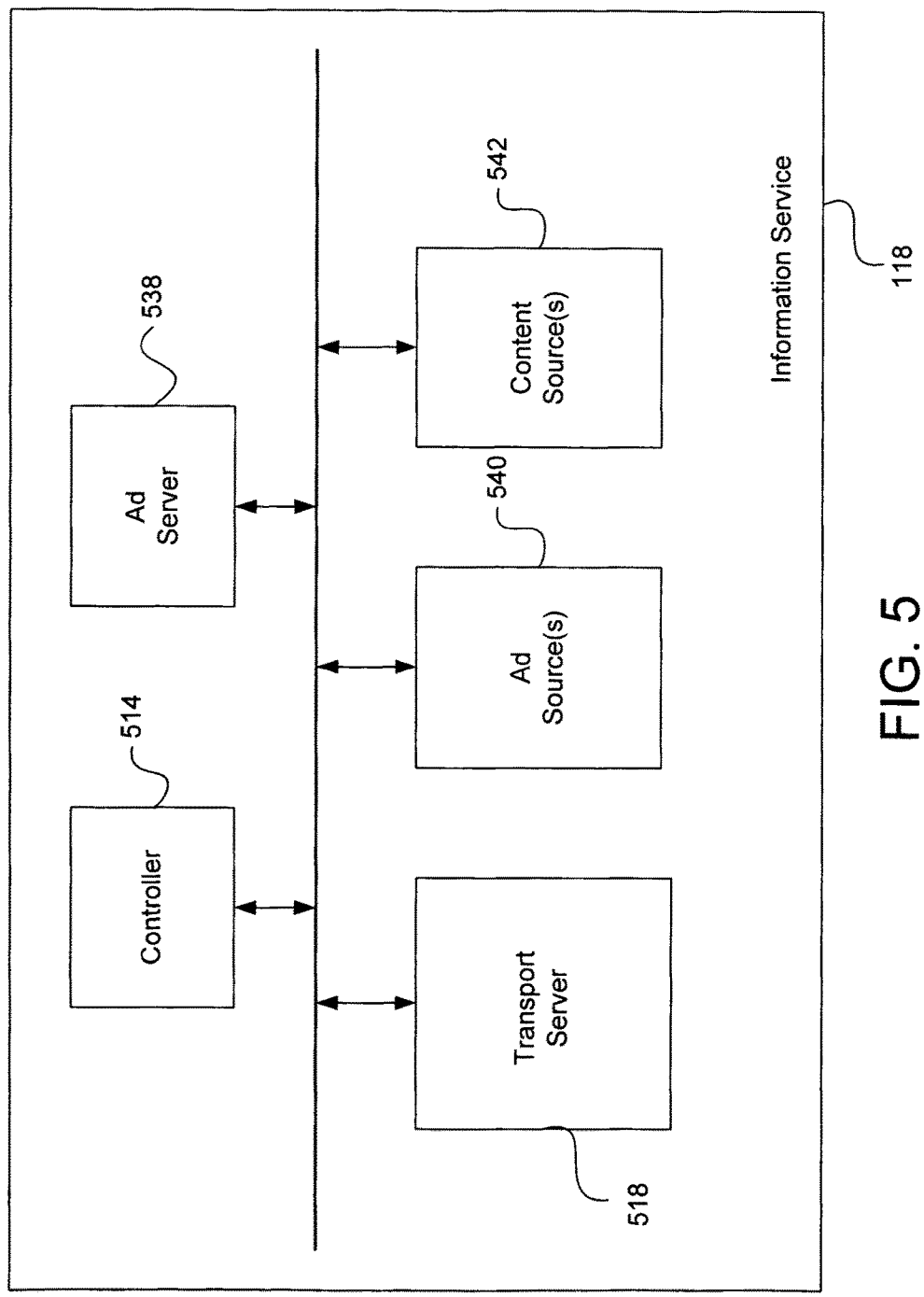
FIG. 5 is a block diagram for one embodiment of the information service from FIG. 1A, in accordance with the present invention.

In the FIG. 2A embodiment, advertiser metadata 234 may include information regarding one or more advertisers that are associated with distribution system 110. In certain embodiments, the advertisers may be associated with ad sources 540 (FIG. 5). In the FIG. 2A embodiment, catalog metadata 240 may include any appropriate type of information related to certain definable inventory items or categories in corresponding advertising catalogs. For example, catalog metadata 240 may include, but is not limited to, current monitored inventory levels for corresponding inventory items or inventory categories, current physical location information for corresponding user devices, and specific commercial transactions involving identified device users or corresponding user devices 122 (for example, purchase transactions).

In the FIG. 2A embodiment, feedback metadata 242 may include any appropriate information or statistics that relates to the utilization or selection of corresponding advertisements or reminders by respective device users. In certain embodiments, feedback metadata 242 may be collected from corresponding user devices 122 and provided via transport structure 210 to appropriate entities. For example, certain advertisers may access the feedback metadata 242 for evaluating the efficiency characteristics of corresponding advertisements or reminders.

In the FIG. 2A embodiment, media link 246 may include appropriate information to indicate a location or a connection means for accessing one or more media files, as discussed below in conjunction with FIG. 2B. In the FIG. 2A embodiment, task instructions 250 may include any appropriate instructions or other information that indicate specific tasks, operations, functions, or steps for performance by transport structure 210. For example, in certain embodiments, task instructions 250 may include detailed instructions describing the type of information that transport structure 210 is directed to collect and/or distribute. In the FIG. 2A embodiment, navigation instructions 254 may include any appropriate instructions or other information that provide specific navigational directions or limitations for transport structure 210. For example, in certain embodiments, navigation instructions 216 may define at least one navigation path that is defined by one or more origin points and one or more destination points.

Various entities in distribution system 110 may utilize the information in transport structure 210 in any appropriate manner. For example, a reminder/advertising targeting procedure may be performed by matching compatible elements of user metadata 222, device metadata 226, catalog metadata 240, and advertiser metadata 234 to thereby to identify appropriate types of relevant reminder/advertising information for automatic transmission to targeted device users.

Transport structures 210 may be originated in any effective manner from any appropriate source. For example, transport structures 210 may be embedded in user devices 122 (FIG. 1A), and activated by device users if desired. Alternately, various entities in network 126 or information service 118 may create or activate transport structures 210. For example, a transport server (see FIG. 6A) may manage the origination and operation of transport structures 210. Further details regarding the implementation and utilization of the FIG. 2A transport structure 210 are discussed below in conjunction with FIGS. 2B-8C.

Figure 2B:
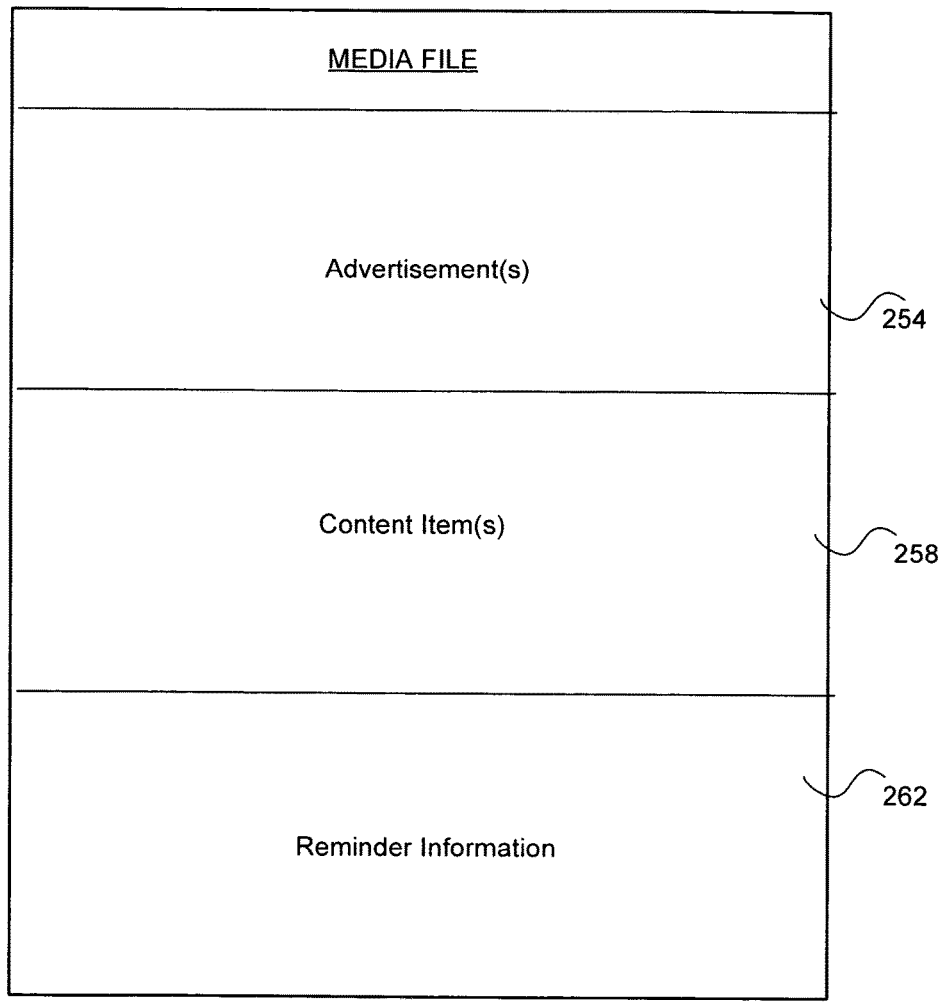
FIG. 2B is a block diagram for one embodiment of a media file, in accordance with the present invention.

Referring now to FIG. 2B, a block diagram for one embodiment of a media file 250 is shown, in accordance with the present invention. The FIG. 2B embodiment is presented for purposes of illustration, and in alternate embodiments, media file 250 may be implemented by utilizing components and configurations in addition to, or instead of, certain of those components and configurations discussed in conjunction with the FIG. 2B embodiment. For example, the FIG. 2B media file 250 is shown as a separate entity that is accessible by utilizing the media link 246 of FIG. 2A. However, in alternate embodiments, media file 250 may be implemented as an integral part of transport structure 210 of FIG. 2A.

In the FIG. 2B embodiment, advertisements (ads) 254 may include any appropriate type of targeted advertising information that has been selected for transmission to appropriate ones of the user devices 122 (FIG. 1A). Similarly, content items 258 may include any appropriate type of electronic content information that has been selected for transmission to appropriate ones of the user devices 122. For example, content 258 may include, but is not limited to, video data, audio data, graphics, text, movies, music recordings, and computer programs.

In the FIG. 2B embodiment, reminder information 262 may include any appropriate type of information or data. For example, reminder information 262 may include, but is not limited to, text messages or audio-visual information that are intended to remind device users about purchasing opportunities with respect to inventory items from an advertising catalog (see FIG. 6C). Further information for providing appropriate media files 250 to targeted device users is further discussed below in conjunction with FIGS. 3-8C.

Referring now to FIG. 3, a block diagram for one embodiment of a FIG. 1A user device 122 is shown, in accordance with the present invention. In the FIG. 3 embodiment, user device 122 includes, but is not limited to, a central processing unit (CPU) 314, a memory 318, a display 338, and one or more input/output interface(s) (I/O interface(s)) 340. The FIG. 3 embodiment is presented for purposes of illustration, and in alternate embodiments, a user device 122 may be implemented using components and configurations in addition to, or instead of, certain of those components and configurations discussed in conjunction with the FIG. 3 embodiment. In addition, user device 122 may be implemented as any type of portable or non-portable electronic device, including, but not limited to, a desktop computer, a personal digital assistant, a cellular telephone, an electronic transaction card, a digital sign device, a settop box, or a laptop computer.

In the FIG. 3 embodiment, CPU 314 may be implemented to include any appropriate and compatible microprocessor device that preferably executes software instructions to thereby control and manage the operation of user device 122. The FIG. 3 display 338 may include any effective type of display technology including a cathode-ray-tube monitor or a liquid-crystal display device with an appropriate screen for displaying various information to a device user. In the FIG. 3 embodiment, I/O interface(s) 340 may include one or more input and/or output interfaces to receive and/or transmit any required types of information by user device 122. In the FIG. 3 embodiment, memory 318 may be implemented to include any combination of desired storage devices, including, but not limited to, read-only memory (ROM), random-access memory (RAM), and various types of non-volatile memory, such as floppy disks, memory sticks, compact disks, or hard disks. Additional details for the utilization of user device 122 are further discussed below in conjunction with FIGS. 4-8C.

Referring now to FIG. 4, a block diagram for one embodiment of the FIG. 3 user memory 318 is shown, in accordance with the present invention. In alternate embodiments, user memories 318 may be implemented by utilizing components and configurations in addition to, or instead of, certain of those components and configurations discussed in conjunction with the FIG. 4 embodiment.

In the FIG. 4 embodiment, device application 422 may include program instructions that are preferably executed by CPU 314 to perform various functions and operations for user device 122. The particular nature and functionality of device application 422 typically varies depending upon factors such as the specific type and particular functionality of the corresponding user device 122.

In the FIG. 4 embodiment, user device 122 utilizes device application 422 to manage catalog metadata 240, a user profile 430, and a device profile 434 that collectively describe any desired attributes or characteristics related to user device 122 or a device user of user device 122. For example, user profile 430 may include, but is not limited to, information regarding a device user's name, gender, age, religion, hobbies, interests, occupation, marital status, residence, income, Internet browsing history, geographic location, and credit-card transaction records. Similarly, device profile 434 may include, but is not limited to, a device type, a device manufacturer, supported device functionalities, a current device location, and a device configuration.

In addition, in the FIG. 4 embodiment, catalog metadata 240 may include any appropriate type of information that is related to certain definable inventory items or categories in corresponding advertising catalogs. For example, catalog metadata 240 may include, but is not limited to, current monitored inventory levels for corresponding inventory items or inventory categories, current physical location information for corresponding user devices 122, and specific commercial transactions involving identified device users or corresponding user devices 122 (for example, purchase transactions).

In the FIG. 4 embodiment, docking port 438 may include any appropriate type of interface means to facilitate bi-directional communications between one or more transport structures 210 (FIG. 2) and a user device 122. In the FIG. 4 embodiment, advertisements (ads) 442 may include targeted advertising information that has been received via distribution system 110 (FIG. 1A) specifically for a device user of user device 122. Similarly, content 446 may include targeted electronic content information that has been received via distribution system 110 (FIG. 1A) specifically for a device user of user device 122.

In the FIG. 4 embodiment, reminder information 262 may include may include any appropriate type of information or data. For example, reminder information 262 may include, but is not limited to, text messages or audio-visual information that are intended to remind device users about purchasing opportunities with respect to items from an advertising catalog (see FIG. 6C). In the FIG. 4 embodiment, miscellaneous information 454 may include any appropriate additional information or data for utilization by user device 122. For example, in certain embodiments, miscellaneous information 454 may include various types of metadata relating to other entities in distribution system 110 that was downloaded from one or more transport structures 210. Further details regarding the implementation and utilization of the FIG. 4 user memory 318 are discussed below in conjunction with FIGS. 5-8C.

Referring now to FIG. 5, a block diagram for one embodiment of the FIG. 1A information service 118 is shown, in accordance with the present invention. In the FIG. 5 embodiment, information service 118 includes, but is not limited to, a controller 514, a transport server 518, an ad server 538, one or more ad sources 540, and one or more content sources 542. The FIG. 5 embodiment is presented for purposes of illustration, and in alternate embodiments, information service 118 may be implemented using components and configurations in addition to, or instead of, certain of those components and configurations discussed in conjunction with the FIG. 5 embodiment.

In the FIG. 5 embodiment, controller 514 may be implemented to include any effective control means for coordinating operating functionalities of information service 118. For example, in certain embodiments, controller 514 may be implemented as a computer device with a corresponding control application program that manages the operation of information service 118. Alternately, controller 514 may be implemented as a central processing unit that includes any appropriate and compatible microprocessor device for executing software instructions to thereby control and manage the operation of information service 118.

In the FIG. 5 embodiment, transport server 518 may include any effective means for communicating with and controlling one or more transport structures 210 (FIG. 2A), in accordance with the present invention. Additional details regarding the implementation and utilization of transport server 518 are further discussed below in conjunction with FIG. 6A. In the FIG. 5 embodiment, ad source(s) 540 may include one or more appropriate entities for providing advertisement information and reminder information for dissemination through distribution system 110 (FIG. 1A). For example, ad sources 540 may include various commercial enterprises, specific advertisers, or advertising developers.

In the FIG. 5 embodiment, content source(s) 542 may include one or more appropriate entities for providing electronic content for dissemination through distribution system 110. For example, content sources 542 may include various commercial enterprises, specific advertisers, or content producers. In the FIG. 5 embodiment, ad server 538 may include any effective means for identifying and aggregating appropriate advertising information and/or electronic content for providing to targeted device users of user devices 122 (FIG. 1A) by utilizing metadata from one or more transport structures 210 (FIG. 2A). One embodiment of ad server 538 is further discussed below in conjunction with FIG. 7. Additional details for the implementation and utilization of information service 118 are further discussed below in conjunction with FIGS. 6-8C.

Referring now to FIG. 6A, a block diagram for one embodiment of the transport server 518 of FIG. 5 is shown, in accordance with the present invention. In the FIG. 6A embodiment, transport server 518 includes, but is not limited to, a central processing unit (CPU) 614, a memory 618, a display 638, and one or more input/output interface(s) (I/O interface(s)) 640. The FIG. 6A embodiment is presented for purposes of illustration, and in alternate embodiments, transport servers 518 may be implemented using components and configurations in addition to, or instead of, certain of those components and configurations discussed in conjunction with the FIG. 6A embodiment.

In the FIG. 6A embodiment, CPU 614 may be implemented to include any appropriate and compatible microprocessor device that preferably executes software instructions to thereby control and manage the operation of transport server 518. The FIG. 6A display 638 may include any effective type of display technology including a cathode-ray-tube monitor or a liquid-crystal display device with an appropriate screen for displaying various information to a device user. In the FIG. 6A embodiment, I/O interface(s) 640 may include one or more input and/or output interfaces to receive and/or transmit any required types of information by user device 122. In the FIG. 6A embodiment, transport server memory 618 may be implemented to include any combination of desired storage devices, including, but not limited to, read-only memory (ROM), random-access memory (RAM), and various types of non-volatile memory, such as floppy disks, memory sticks, compact disks, or hard disks.

Figure 6B:
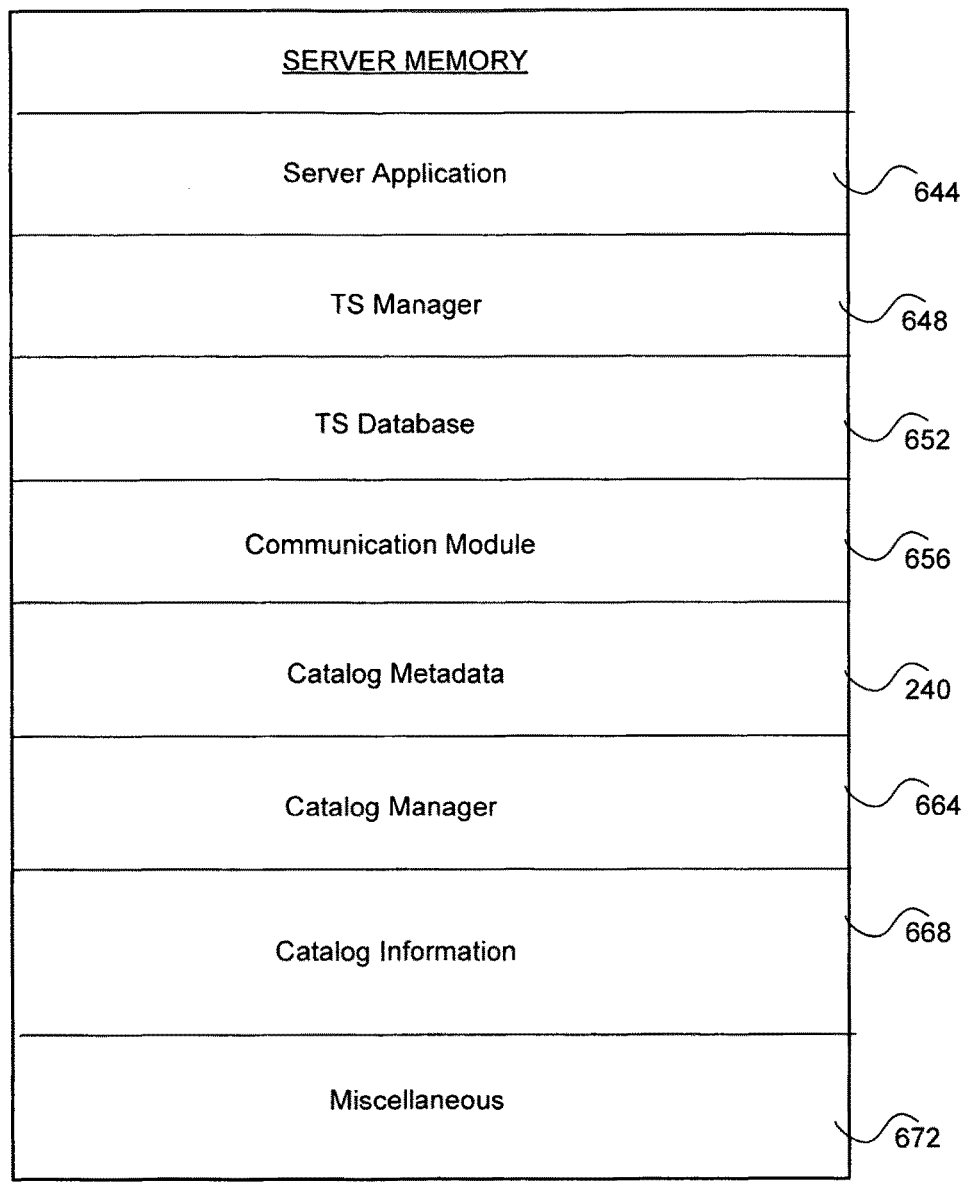
FIG. 6B is a block diagram for one embodiment of the transport server memory from FIG. 6A, in accordance with the present invention.

Referring now to FIG. 6B, a block diagram for one embodiment of the FIG. 6A transport server memory 618 is shown, in accordance with the present invention. In alternate embodiments, transport server memories 618 may be implemented by utilizing components and configurations in addition to, or instead of, certain of those components and configurations discussed in conjunction with the FIG. 6B embodiment.

In the FIG. 6B embodiment, transport server memory 618 may include, but is not limited to, a number of software programs and data that are disclosed below. For example, transport server memory 618 may include a server application 644 of program instructions that are preferably executed by CPU 614 to perform various functions and operations for transport server 518. The particular nature and functionality of server application typically varies depending upon factors such as the specific type and particular functionality of the corresponding transport server 518.

The transport server 518 may utilize a TS manager 648 to manage and coordinate various functions for one or more transport structures 210 (FIG. 2A), in accordance with the present invention. In certain embodiments, the TS manager 648 may include a registration module for coordinating registration procedures to register device users of user devices 122 for participating in various authorized distribution services from distribution system 110 (FIG. 1A). A TS database 652 may include any appropriate information regarding the transport structures 210 that provide distribution services to various entities in distribution system 110.

In certain embodiments, the TS manager 648 may continually update respective transport structure information in the TS database 652 to reflect the current status of transport structures 210 in distribution system 110. The transport server 518 may utilize a communication module 656 to perform bi-directional electronic communication procedures with any appropriate remote entity. For example, the communication module 656 may be utilized to remotely communicate with transport structures 210 in distribution system 110.

In the FIG. 6B embodiment, catalog metadata 240 may include any appropriate type of information that is related to certain definable inventory items or categories in corresponding advertising catalogs. For example, catalog metadata 240 may include, but is not limited to, current monitored inventory levels for corresponding inventory items or inventory categories, current physical location information for corresponding user devices 122, and specific commercial transactions involving identified device users or corresponding user devices 122 (for example, purchase transactions).

In the FIG. 6B embodiment, a catalog manager 664 may perform a metadata analysis procedure by utilizing any effective techniques to produce corresponding targeted and relevant reminder information 262 (FIG. 2B) to be sent to one or more appropriate device users. For example, in certain embodiments, catalog manager 664 may analyze catalog metadata 240 gathered from a user devices 122 and corresponding device users in light of certain predefined criteria to identify specific relevant reminder information 262.

In the FIG. 6B embodiment, catalog information 262 may include any appropriate type of information or data. Additional details regarding one embodiment of catalog information 668 are further discussed below in conjunction with FIG. 6C. In the FIG. 6B embodiment, miscellaneous information 672 may include any desired type of information or data for utilization by transport server 518. The implementation and utilization of transport server 518 is further discussed below in conjunction with FIGS. 6C-8C.

Referring now to FIG. 6C, a block diagram for one embodiment of the FIG. 6B catalog information 668 is shown, in accordance with the present invention. In alternate embodiments, catalog information 668 may be implemented by utilizing components and configurations in addition to, or instead of, certain of those components and configurations discussed in conjunction with the FIG. 6C embodiment.

In the FIG. 6C embodiment, catalog information 668 may include, but is not limited to, a series of individual advertising catalogs 680(a) through 689(n) that each correspond to a respective device user, family, household, business, or other appropriate entity. Any desired number of advertising catalogs 680 may readily be supported. In the FIG. 6C embodiment, each advertising catalog 680 is associated with a corresponding set of inventory data. For example, a catalog A 680(a) includes inventory data A.

In the FIG. 6C embodiment, inventory data may include any desired type of information. For example, inventory data may include, but is not limited to, a series of inventory items with corresponding inventory amounts and reminder thresholds. The inventory items may include any types of products, services, or other consumable items that are designated by device users or any other appropriate entities as inventory items. In the FIG. 6C embodiment, catalog manager 664 (FIG. 6B) continually populates and updates the advertising catalogs 680 by analyzing catalog metadata 240 provided by transport structures 210 or other appropriate information sources.

In the FIG. 6C embodiment, catalog manager 664 may continually compare inventory amounts with specified reminder thresholds for the respective inventory items. Catalog manager 664 may thus generate and send appropriate reminder information 262 (FIG. 2A) to targeted device users when reminder thresholds are reached. The implementation and utilization of catalog information 668 is further discussed below in conjunction with FIGS. 8A-8C.

Figure 7:
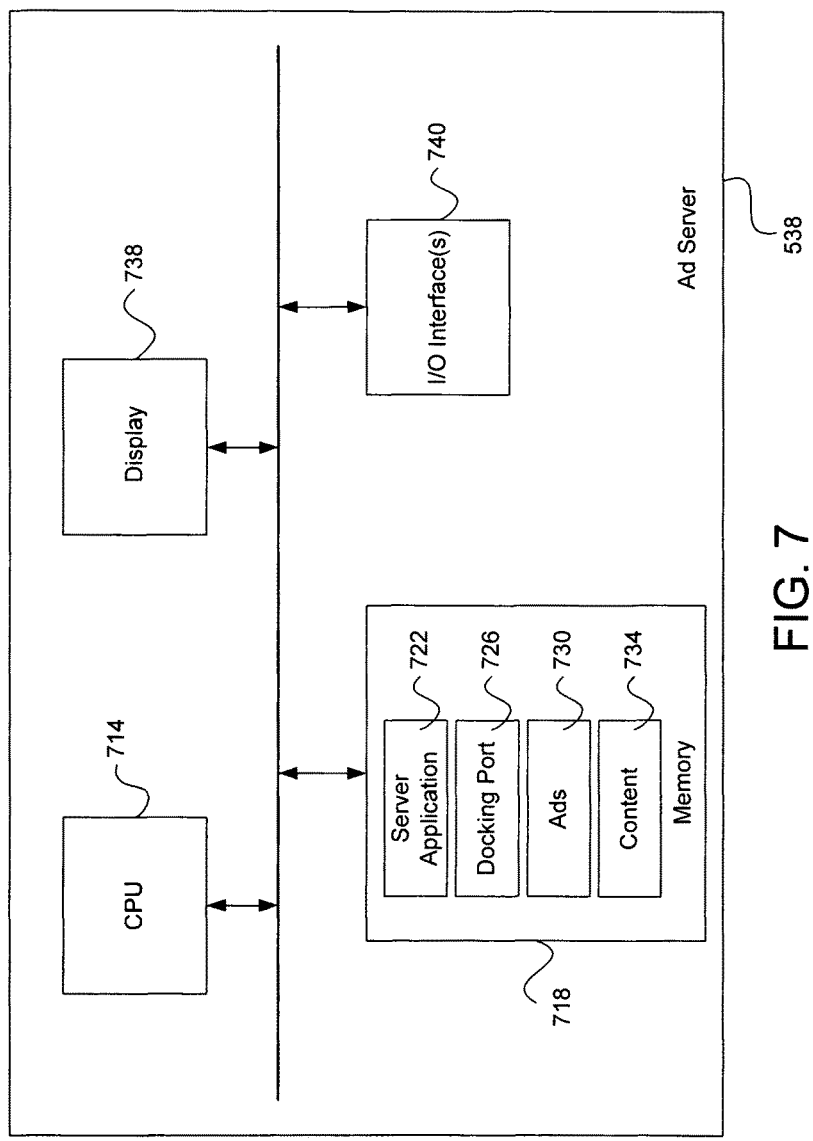
FIG. 7 is a block diagram for one embodiment of the ad server from FIG. 5, in accordance with the present invention.

Referring now to FIG. 7, a block diagram for one embodiment of the ad server 538 of FIG. 5 is shown, in accordance with the present invention. In the FIG. 7 embodiment, ad server 538 includes, but is not limited to, a central processing unit (CPU) 714, a memory 718, a display 738, and one or more input/output interface(s) (I/O interface(s)) 740. The FIG. 7 embodiment is presented for purposes of illustration, and in alternate embodiments, ad server 538 may be implemented using components and configurations in addition to, or instead of, certain of those components and configurations discussed in conjunction with the FIG. 7 embodiment.

In the FIG. 7 embodiment, CPU 714 may be implemented to include any appropriate and compatible microprocessor device that preferably executes software instructions to thereby control and manage the operation of ad server 538. The FIG. 7 display 738 may include any effective type of display technology including a cathode-ray-tube monitor or a liquid-crystal display device with an appropriate screen for displaying various information to a device user. In the FIG. 7 embodiment, I/O interface(s) 740 may include one or more input and/or output interfaces to receive and/or transmit any required types of information by ad server 538.

In the FIG. 7 embodiment, memory 718 may be implemented to include any combination of desired storage devices, including, but not limited to, read-only memory (ROM), random-access memory (RAM), and various types of non-volatile memory, such as floppy disks, memory sticks, compact disks, or hard disks. In the FIG. 7 embodiment, memory 718 includes, but is not limited to, a server application 722, a docking port 726, ads 730, and content 734.

In the FIG. 7 embodiment, server application 722 may include program instructions that are preferably executed by CPU 714 to perform various functions and operations for ad server 538. The particular nature and functionality of server application 722 typically varies depending upon factors such as the specific type and particular functionality of the corresponding ad server 538. In certain embodiments, server application 722 may analyze information or instructions from transport server 518 or transport structures 210 to match appropriate media files 250 (FIG. 2B) with targeted device users of user devices 122 (FIG. 3).

In the FIG. 7 embodiment, docking port 726 may include any effective interface means for ad server 538 to bi-directionally communicate with one or more transport structures 210 (FIG. 2) to transfer ads 730, content 734, or any other types of information. In the FIG. 7 embodiment, ads 730 include advertising or coupon information that is provided to ad server 538 from any appropriate entities, such as ad sources 540 (FIG. 5). Similarly, in the FIG. 7 embodiment, content 734 includes electronic content that is provided to ad server 538 from any appropriate entities, such as content sources 542 (FIG. 5).

Figure 8A:
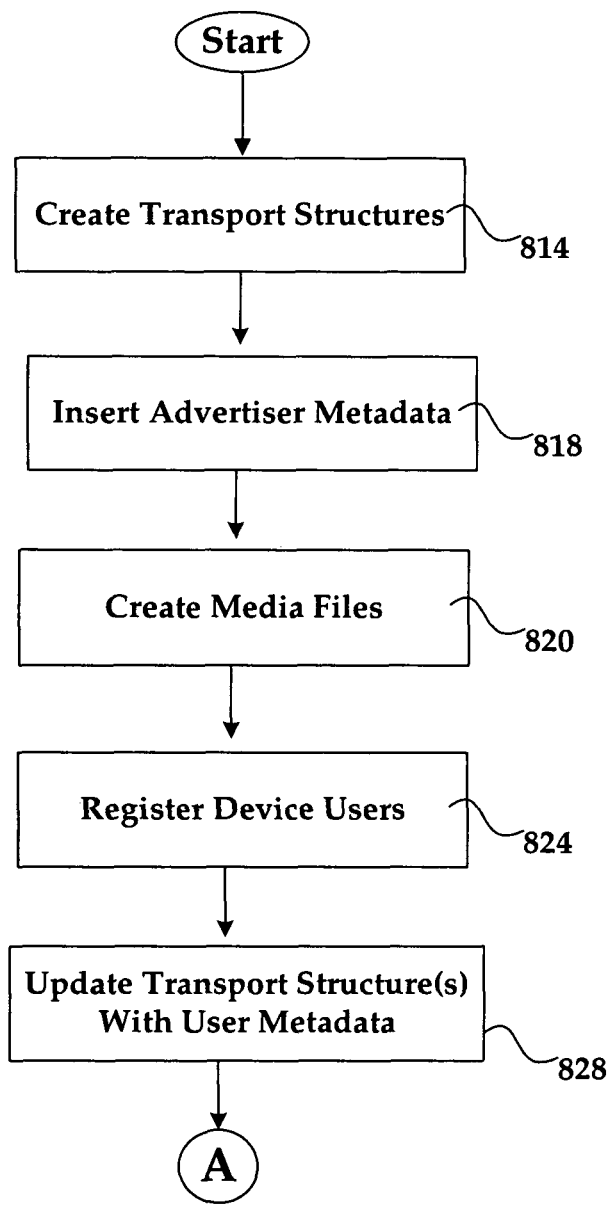
FIGS. 8A-8C are a flowchart of method steps for effectively supporting an advertising catalog, in accordance with one embodiment of the present invention.
Figure 8B:
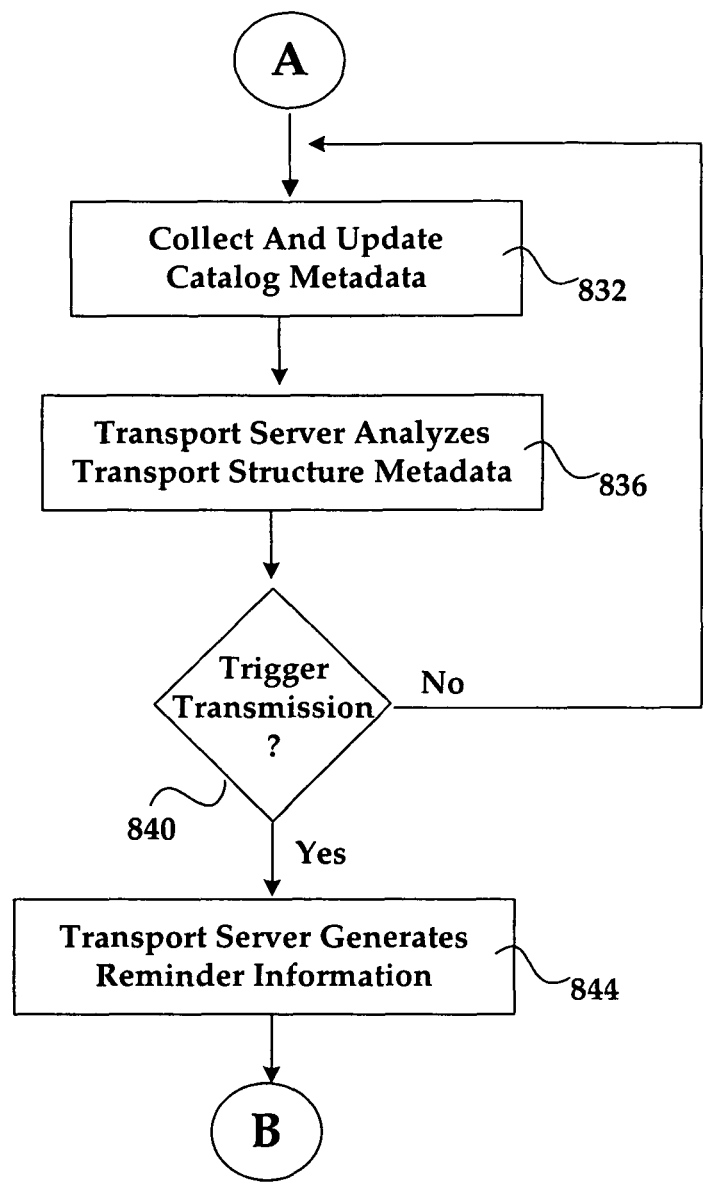
Figure 8C:
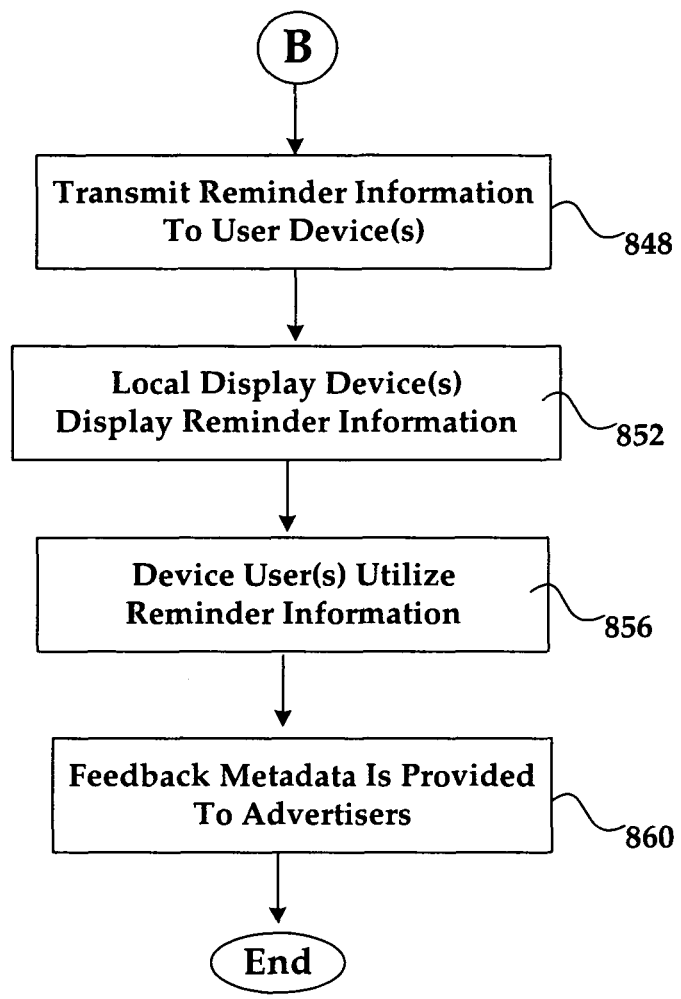

Referring now to FIGS. 8A-8C, a flowchart of method steps for effectively supporting an advertising catalog is shown, in accordance with one embodiment of the present invention. The FIG. 8 flowchart is presented for purposes of illustration, and in alternate embodiments, the present invention may utilize steps and sequences other than those steps and sequences discussed in conjunction with the FIG. 8 embodiment.

In step 814 of FIG. 8A, one or more transport structures 210 (FIG. 2A) are initially created in any effective manner. For example, transport structures 210 may be embedded in user devices 122 during manufacture, and then activated by device users. Alternately, an appropriate entity (such as a transport server 518) in a distribution system 110 may create or otherwise provide the initial transport structures 210. In step 818, advertiser metadata 234 from one or more advertisers 814 may be added to the transport structures 210 in any desired manner to represent relevant characteristics and advertising goals of the corresponding advertisers 814.

In step 820, appropriate media files 250 may be created to include information for dissemination to targeted device users through distribution system 110. The media files 250 may include any desired information, such as advertisements 254, content items 258, and reminder information 262. In step 824, device users perform a registration procedure to receive information from the distribution system 110. During the registration procedure, the device users typically provide relevant information including, but not limited to, user metadata 222 and device metadata 226. In step 828, the transport structures 210 are updated to include the metadata provided by the device users during the foregoing registration procedure. The FIG. 8A process then advances to step 832 of FIG. 8B through connecting letter "A."

In step 832, catalog metadata 240 is collected from appropriate sources in any effective manner. For example, catalog metadata 240 may be obtained from appropriate user devices 122, merchant transaction devices, and intelligent home appliances and/or storage cabinets. In the FIG. 8 embodiment, the catalog metadata 240 is then utilized to update corresponding information in one or more transport structures 210 for transfer to a transport server 518.

In step 836, transport server 518 or another appropriate entity analyzes the metadata provided by the transport structure(s) 210. In step 840, in light of the foregoing metadata analysis and predefined transmission criteria, the transport server 518 determines whether to transmit corresponding reminder information 262 and/or advertising information to targeted device users. If the specified transmission criteria are satisfied, then in step 844, the transport server 518 generates appropriate reminder information 262 for targeted device users by utilizing any effective means. For example, in certain embodiments, a catalog manager 664 of transport server 518 generates predefined reminder information 262 related to an advertising catalog 680 when a respective inventory amount falls below a reminder threshold for a corresponding inventory item. The FIG. 8B process then advances to step 848 of FIG. 8C through connecting letter "B."

In step 848, the transport server 518 transmits the generated reminder information 262 to the targeted device users by utilizing any effective means. For example, in certain embodiments, one or more transport structures 210 may be utilized to convey reminder information 262 to respective user devices 122. In step 852, a local display device of a user device 122 displays the received reminder information 262 for viewing by the device users. In step 856, the device users may then advantageously utilize the reminder information 262 in any appropriate manner. For example, in certain embodiments, device users may responsively perform a commercial transactions to obtain one or more inventory items that are referenced in the reminder information 262.

Finally, in step 860, feedback metadata 242 regarding the reminder information 262 and/or the commercial transaction may be generated and provided to advertisers or other interested entities in any effective manner. For example, in certain embodiments, a user device 122 of a merchant involved in the commercial transaction may automatically generate feedback metadata 242. In addition, a user device 122 of the device user may alternately generate the feedback metadata 242. In the FIG. 8C embodiment, the feedback metadata 242 may be transported to advertisers or other interested parties by utilizing one or more transport structures 210 or other effective techniques. Based upon the feedback metadata 242, advertisers may thus more accurately analyze the effectiveness and efficiency of their corresponding advertisements and reminder strategies. For at least the foregoing reasons, the present invention therefore provides an improved system and method for effectively supporting an advertising catalog in an electronic network.

The invention has been explained above with reference to certain embodiments. Other embodiments will be apparent to those skilled in the art in light of this disclosure. For example, the present invention may readily be implemented using certain configurations and techniques other than those described in the specific embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for implementing an information distribution network, said system comprising:
   a transport server configured to provide information distribution services through said information distribution network;
   user devices that device users utilize to connect with said transport server to automatically receive said information distribution services,
   wherein said system utilizes a transport structure configured to communicate with said transport server and said user devices in said information distribution network,
   wherein said transport structure is updated based on metadata from said user devices to transfer said metadata to said transport server, wherein said metadata is used to identify and transmit reminder information from said transport server to a target user device of said user devices, and wherein said reminder information is displayed on a display device of said target user device,
   wherein said transport server is further configured to:

store a current status of said transport structure in a database; and analyze said metadata to generate said reminder information, and wherein said transport structure comprises a plurality of fields, and wherein a first user device of said user devices is configured to automatically monitor inventory of consumable products in said first user device, update said plurality of fields of said transport structure with said metadata related to said inventory, and communicate with a second user device of said user devices via said transport structure to communicate a current status of consumption of said inventory in said first user device to said second user device.

2. The system of claim 1, further configured to utilize a catalog of inventory items that include products, services, and consumable items, wherein one or more of said inventory items are designated by said device users, wherein said catalog includes inventory data corresponding to respective ones of said inventory items, and said inventory data includes current inventory amounts and reminder thresholds for each of said inventory items, wherein said reminder thresholds are set based on times elapsed since previous purchases of said inventory items and historic rates of consumption of said inventory items, wherein said transport server is further configured to compare continuously inventory amounts of said inventory items with respective ones of said reminder thresholds, and wherein said transport server is further configured to automatically generate and send said reminder information to targeted ones of said device users based on a determination that said reminder thresholds are reached.

3. The system of claim 2, wherein said metadata includes catalog metadata related to said inventory items from said catalog.

4. The system of claim 3, wherein said metadata further includes at least one of user metadata about said device users, device metadata about said user devices, geographic location metadata, or advertiser metadata.

5. The system of claim 3, wherein said reminder information includes text messages and audio-visual information to remind a target device user about purchasing opportunities for said inventory items from said catalog.

6. The system of claim 3, wherein said catalog metadata includes current monitored inventory levels for said inventory items from said catalog, and commercial transaction details of transactions of said device users.

7. The system of claim 3, wherein said catalog further includes inventory data corresponding to respective ones of said inventory items, said inventory data including current inventory amounts and said reminder thresholds for each of said inventory items.

8. The system of claim 7, further comprising a catalog manager configured to collect said catalog metadata from said transport server to populate and update said inventory data of said catalog.

9. The system of claim 8, wherein said catalog manager is further configured to compare said current inventory amounts to said reminder thresholds, wherein said catalog manager is further configured to generate said reminder information based on a determination that said current inventory amounts fall below said reminder thresholds.

10. The system of claim 3, wherein said first user device is further configured to generate said catalog metadata to indicate current inventory amounts of said inventory items.

11. The system of claim 3, further comprising at least one commercial transaction device configured to generate said catalog metadata to indicate details of commercial transactions based on said reminder information.

12. The system of claim 11, wherein said reminder information includes content information associated with to purchase of complementary items, wherein the complementary items are determined based on said inventory items.

13. The system of claim 3, wherein said catalog metadata includes user preferences that are provided by said device users to include one or more of said inventory items in said catalog, said catalog metadata including user preferences that are created by said device users to avoid specific types of said reminder information.

14. The system of claim 1, wherein said transport structure comprises feedback metadata related to usage characteristics of said reminder information, and said feedback metadata is provided to entities to evaluate efficiency of utilization of said reminder information.

15. The system of claim 3, further comprising a customer relationship management device configured to generate feedback metadata related to purchase transactions based on said reminder information, wherein said feedback metadata is provided to one or more servers.

16. The system of claim 1, wherein said user devices are used to update one or more fields of said plurality of fields of said transport structure.

* * * * *